Figure 1:
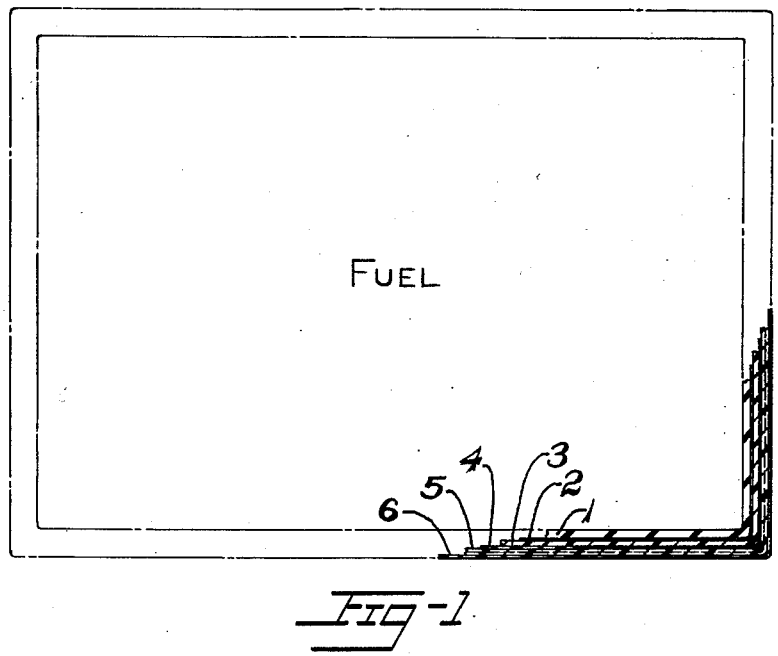

Dec. 10, 1957     S. T. SEMEGEN ET AL     2,816,055

FUEL CELL AND METHOD OF MAKING SAME

Filed Nov. 3, 1954

INVENTORS
STEPHEN T. SEMEGEN
BY   VERNON G. BOGER

ATTY.

United States Patent Office 2,816,055
Patented Dec. 10, 1957

2,816,055

FUEL CELL AND METHOD OF MAKING SAME

Stephen T. Semegen, Cuyahoga Falls, and Vernon G. Boger, Akron, Ohio, assignors to The B. F. Goodrich Company, New York, N. Y., a corporation of New York Application November 3, 1954, Serial No. 466,626

19 Claims. (Cl. 154—139)

This invention relates to new liquid-vapor barriers. In particular, this invention relates to a novel composition of matter useful in forming a liquid-vapor barrier in fuel cells, to a novel fuel cell embodying said barrier composition and to a novel method of making said fuel cell utilizing said barrier composition.

Nylon or long-chain linear superpolyamides have long been used as liquid-vapor barrier layers in fuel cells. The function of the polyamide is to prevent any aromatic or aromatic-aliphatic composition liquids or vapors which manage to diffuse through the inner fuel or oil-resistant rubber layer from continuing through the remainder of the cell to cause a hazardous build-up of fuel or to reach the sealant and other rubbery layers and destroy them. It has been found, however, that the nylon barrier layer tends to crack and shrink during manufacture and storage so that its usefulness is impaired resulting in the rejection of a large number of cells. Sometimes these cracks appear during operation. Obviously then, fuel cells which have a cracked barrier layer or in which the barrier shrinks to pull away from the other members of the structure are dangerous to use and cannot be employed wherever there might be a dangerous build-up of gaseous or liquid fuel which might result in an explosion or where the fuel might injure or destroy the rubber sealant. This problem becomes particularly acute when manufacturing large fuel cells which may have a length of ten feet or more. In small fuel cells the shrinkage will cause a pulling away of the fuel resistant layer to result in thin spots and pinholing in the fuel resistant inner layer and tend to crack the polyamide barrier to reduce the life of the cell and impair the safety of the plane or other machine whereas in large cells the shrinkage will be so great as to pull the fuel resistant rubber inner layer away from the corners, edges and ply laps and split it while the barrier layer itself is cracked. For example, where a test specimen 12" long shrinks a few percent, the shrinkage in a large cell of a length of ten feet or more will be greatly magnified to result in damage to the cell. Accordingly, it is a primary object of the present invention to provide an article of manufacture which has a liquid-vapor barrier layer of a superpolyamide characterized by freedom from cracks and excessive shrinkage.

It is another object of the present invention to provide a fuel cell having a crack-free liquid-vapor barrier layer exhibiting improved shrink resistance.

Still another object is to provide a method for making an article of manufacture having a liquid-vapor barrier layer free of cracks and exhibiting little or no shrinkage.

Yet another object is to provide a method for producing a fuel cell containing a liquid-vapor barrier layer of a long-chain linear superpolyamide characterized by being free of cracks and of any appreciable tendency to shrink.

A further object is to provide a composition of matter comprising a long-chain linear superpolyamide which when applied as a liquid-vapor barrier layer does not crack and does not appreciably shrink.

A still further object is to provide a composition of matter comprising a long chain linear superpolyamide containing a compound which tends to prevent the formation of cracks and shrinkage when the superpolyamide is employed as a liquid-vapor barrier in fuel cells.

Figure 2:
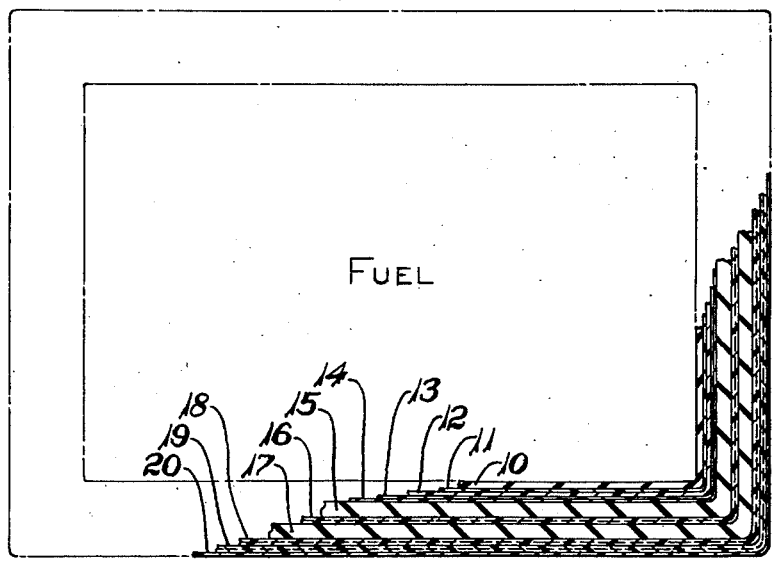

These and other objects and advantages of the present invention will become more apparent to those skilled in the art from the following detailed description, examples and drawing, wherein, Fig. 1 is a view partly in cross section of a representative fuel cell embodying the novel barrier layer of the present invention, and Fig. 2 is a view partly in cross section of another representative fuel cell embodying the novel barrier layer of the present invention.

It has now been discovered according to the present invention that by incorporating a minor amount of a highly polar aromatic compound with an aromatic insoluble long-chain linear superpolyamide, a crack-free and shrink-resistant liquid-vapor barrier layer for fuel cells can readily be produced. The highly polar aromatic compound can be used in the conventional polyamide solutions comprising a volatile organic solvent composition and brushed, dipped or sprayed one or more times to provide a coating of the requisite flexibility and thickness on drying or evaporation of the solvent. Cells having barrier layers prepared as disclosed herein do not crack during or after storage for extended periods of time. Moreover, even after extended service use, cracks are not evident. The shrinkage has been reduced by about 50 to 100% of the shrinkage observed when using only the polyamide. Hence, the present invention eliminates costly manufacturing and storage rejects as well as hazards incident to actual use caused by the dangerous cracks and excessive shrinkage exhibited by barrier layers heretofore employed.

Fig. 1 of the drawing illustrates a representative bladder-type fuel cell embodying the novel barrier layer of the present invention. The fuel is contained in a chamber having walls of a layer of vulcanized fuel-resistant rubber 1 which may be a rubbery copolymer of from about 55 to 75% by weight of butadiene-1,3 and the balance acrylonitrile containing the usual compounding ingredients such as accelerator, antioxidant, curing agent, reinforcing pigment, etc. In place of the butadiene-acrylonitrile rubber, "Thiokol" rubber (polysulfide rubber) or a polyester rubber may be employed. These rubbers are resistant to aromatic as well as to aliphatic fuels. If only predominantly aliphatic fuels are to be used, a polychlorobutadiene rubber such as "neoprene GN" may be employed. However, to provide for ease in the interchangeability of fuels and to avoid the possibility of the wrong fuel being used with a particular rubber, it is preferred to use the copolymerized butadiene-acrylonitrile, polysulfide or polyester rubber. The next layer, 2, comprises one or more coats of an adhesive composition, such as a mixture of a rubbery butadiene-1,3-acrylonitrile copolymer mixed with a resorcinol-formaldehyde resin, to secure superpolyamide barrier layer 3 to layer 1. Adhesive layer 4 is similar to layer 2. Light weight fabric ply layer 5 of woven nylon or other fiber and calendered on each side with a coating of a composition comprising a 55–75 butadiene-1,3, balance acrylonitrile copolymer is secured to adhesive layer 4. Spray or brushed lacquer coat 6 of a mixture comprising a rubbery butadiene-1,3 acrylonitrile copolymer and polyvinyl chloride containing a minor amount of an adhesive resin composition completes the assembly. It, of course, is apparent that the number of layers and/or coatings of adhesive and the compositions of the adhesives and rubber may be varied as desired. The fabric ply can be of a heavier and/or stronger construction to provide crack resistance or the number of fabric plies can be increased. Moreover, the liquid-vapor barrier may be positioned outward from the fabric ply although it is preferably placed adjacent the fuel-resistant rubber layer.

A representative self-sealing type fuel cell is disclosed in Fig. 2 of the drawing wherein inner layer 10 is of a vulcanized fuel resistant copolymerized butadiene-1,3-acrylonitrile rubber, layer 11 comprises one or more coats of a butadiene-acrylonitrile rubbery copolymer-resorcinol aldehyde resin adhesive mixture and layer 12 is the superpolyamide barrier coating of the present invention. Adhesive layer 13 is similar to layer 11 and is overcoated with adhesive layer 14 containing a partially chlorinated rubber to secure sealant layer 15 to the barrier layer. The sealant may be of natural or other rubber, preferably a rubber which has low freezing point properties and which is only partially cured, if at all, so that it will swell on contact with the fuel when punctured. It may also be nervy and tacky. Other puncture-sealing compositions or materials such as cellular rubber can likewise be used. Woven fabric layer or ply 16 of a superpolyamide or other material and coated on both sides with a natural rubber composition is adjacent sealant layer 15 and also sealant layer 17 which is similar to layer 15. Layer 18 is a fabric ply similar to layer 16 and layer 19 is a fabric ply coated on one side with a composition comprising natural rubber or a rubbery butadiene-1,3-styrene copolymer and on the other side with a mixture of a butadiene-1,3-acrylonitrile rubber and natural rubber or rubbery butadiene-1,3-styrene copolymer. Outer coat 20 comprises a mixture of a rubbery copolymer of butadiene-1,3 and acrylonitrile and polyvinyl chloride with a minor amount of an adhesive resin composition. The number of layers of the adhesive, rubber and fabric employed, the thickness of the various layers, and their compositions can be varied somewhat to meet the desired conditions of flexibility, weight, wear, crash-resistance, etc. Moreover, various compounding ingredients can be added to the different adhesive and rubber compositions in the layers described to obtain the desired properties. While the barrier layer may be positioned in any place in the assembly, it is apparent that it should be disposed between the fuel and the sealant layers if it is to serve the function of protecting the sealant layers from the vapors of the fuel when it is of aromatic composition as well as to prevent diffusion of fuel out of the cell itself. Furthermore, in both types of fuel cells shown in the drawing the fuel or oil-resistant rubber inner layers can be omitted so that the polyamide alone serves to prevent diffusion of the fuel. However, it is preferred that the inner layer be of fuel or oil-resistant rubber to protect the polyamide layer from wear, during handling, etc. Fuel inlet and outlet lines, man holes, fittings, etc., are not shown in the drawing but can be a part of the structures described as is well known to those in the art.

The composition of the present invention used to form the liquid-vapor barrier of the fuel cell is prepared from a solution of the polyamide and the highly polar aromatic compound in a volatile organic solvent composition.

The solvent employed to dissolve the polyamide should be a volatile or vaporizable organic composition which on evaporation or removal will provide a continuous film of the polyamide composition. Moreover, the solvent should be volatile, vaporize or exhibit a positive vapor pressure from about room temperature to below the curing temperature of the rubber so that the solvent can readily be removed without causing swelling of the rubber if some heat is applied to increase the rate of volatilization. If the heating step is employed under pressure, higher temperatures can be used. Preferably, the solvent should be volatile or vaporize below a temperature of about 120–140° F., and more preferably, it should be volatile at room temperature. Examples of suitable solvents are methanol, ethanol, butanol, isopropanol, dimethyl formamide, ethanol formamide, ethylene chlorohydrin, and the like. Water as a diluent or to increase the solvent power of the solvent can be used with the balance being the solvent in amounts up to 50% by weight, although preferably the amount of water will vary from about 5 to 30% by weight, the balance being the solvent, to avoid any tendency toward checking (the formation of an alligator type surface appearance) or blushing (whitening). A mixture of ethanol and water is the preferred solvent composition to use in the practice of the present invention. Chlorinated hydrocarbons can also be used as diluents.

The polyamide used to form the barrier coating can be any long-chain linear superpolyamide which is characterized by being essentially insoluble in or by acting as a barrier to aromatic and aromatic-containing fuels and wherein the amide groups are separated by hydrocarbon groups containing at least two carbon atoms. They can be prepared by the interaction of a polybasic acid and a diamine. Some examples of polyamides falling within the above definition and which can be employed in the practice of the present invention are the co- or interpolymers of hexamethylene diamine and adipic acid; hexamethylene diamine and glutaric acid; ethylene diamine and glutaric acid; pentamethylene diamine and dodecamethylene dicarboxylic acid; pentamethylene diamine and ethyl sebacate; and propylene diamine and sebacic acid. Other co- or interpolymers may be used such as the copolymer of hexamethylene diammonium adipate and decamethylene diammonium sebacate; the co- or interpolymer of hexamethylene diamine, adipic acid, sebacic acid, and amino caproic acid; hexamethylene diammonium adipate and aminocaproic acid or epsiloncaprolactam; 3,3'-diaminodipropyl ether and adipic acid; hexamethylene diammonium adipate, hexamethylene diammonium azelate, and aminocaproic acid and the like. Self-polymerized monoaminomonocarboxylic acids such as polymerized 6-aminocaproic acid, polymerized 9-aminononanoic acid, and polymerized 11-aminoundecanoic acid are still other examples of linear condensation products of amino acids which can likewise be employed in the barrier layer composition.

Still other linear superpolyamides may be used such as those having a minor proportion of the amido hydrogen atoms replaced with alkoxyalkyl radicals, for example, alkoxymethyl or alkoxyethyl radicals or mixtures thereof. Thus, from about 1 to 15% of the amido hydrogen atoms in the linear polymeric structure containing recurring

groups are replaced with alkoxymethyl or alkoxyethyl radicals to give recurring groups of the structure

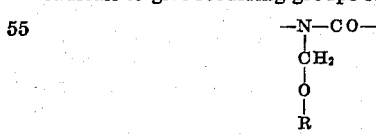

or

where R is an alkyl group having from 1 to 8 carbon atoms, preferably from 1 to 3 carbon atoms of which the methoxymethyl and ethoxymethyl substituted linear superpolyamides are most desirable. These polyamides differ from the corresponding unsubstituted polyamides in having lower softening points, lower melting points, and in being more thermosetting rather than thermoplastic when subjected to curing conditions. They can be prepared by treating a linear superpolyamide which has hydrogen-bearing carbon amide groups with formaldehyde and the like and an alcohol in the presence of an oxygen-containing acid. The acid catalyst can be either an organic acid or a relatively weak inorganic acid, such as the acids of phosphorus, which have an ionization constant less than 2. For example, the reaction can be carried out by heating at about 60° C. a solution of the initial polyamide, such as polyhexamethylene adipamide, in solution in formic acid with a solution of para-formaldehyde in methanol and isolating the product.

Mixtures of the homo-, co-, inter- or substituted polyamides can also be used in practice of the present invention.

The highly polar aromatic compound used with the polyamide is a compound containing at least two highly polar groups attached to the aromatic nucleus. Examples of suitable highly polar aromatic compounds are resorcinol, hydroquinone, phloroglucinol, 1,2,3,5-benzenetetrol, pentahydroxy benzene, hexahydroxy benzene, catechol, 3-methyl pyrocatechol, tertiary butyl catechol, 4-ethyl resorcinol, 5-methoxy resorcinol, 2-methyl resorsinol, pyrogallol, 5-methyl pyrogallol, salicylic acid, phthalic acid, 4-chlorophthalic acid, acetyl salicylic acid, 2-hydroxy-1-naphthoic acid and the like, and mixtures thereof. Hence, it is seen that the highly polar aromatic compound can have the following general formula:

$$(R)_x[Ar](P)_y$$

where Ar is an aromatic nucleus, where R is selected from at least one of the class consisting of alkoxy, alkyl, halogen and hydrogen, where $x$ is a number from 4 to 0, where P is selected from at least one of the class consisting of —OH, —COOH, —COOR$_2$, —OCOH and —OCOR$_2$ where R$_2$ is alkyl and where $y$ is a number from 2 to 6.

The polyamide is used in a major amount with respect to the highly polar aromatic compound in the composition of the barrier layer. Very minor amounts of the highly polar aromatic compound show decided improvement. However, preferably, the ratio of polyamide to compound will vary from about 85:15 to 65:35 parts by weight, or, there will be present in the barrier layer composition from about 65 to 85 parts by weight of the polyamide, the balance being the highly polar aromatic compound, to provide the best coating characteristics as far as crack-resistance, shrink-resistance, checking, vapor transmission and the like are concerned.

In the barrier coating composition the mixture of solid materials, the polyamide and the highly polar aromatic compound, which remain after evaporation of the solvent are used in a minor amount with respect to the amount of volatile organic solvent composition employed. However, it is preferred to employ a solution having a total solids content (polyamide and highly polar aromatic compound) of only from about 5 to 20% by weight of the solution for ease in spreading, coating and handling.

There may also be present in the barrier layer composition herein described minor amounts of dyes, pigment colors such as titanium dioxide, fluorescent pigments, antioxidants, cross-linking agents such as aldehydes and the like to color the barrier layer, improve adhesion, etc.

Preparation of the coating composition is readily accomplished by dissolving the polyamide in the solvent composition at room temperature or when heated up to a temperature of about 100–150° F. or higher, charging the highly polar aromatic compound in the proper amount to the heated solvent, and stirring while refluxing until the polyamide is in solution. When cool, the solution is clear and no particles are visible to the naked eye indicating that the mixture is a true solution or that if any particles of undissolved polyamide are present they are so small and so well dispersed that they are not readily discernable.

After the barrier coating composition has been prepared as described above, it can readily be brushed, sprayed, etc., onto the adhesive layer on the surface of the inner fuel-resistant vulcanizable unvulcanized rubber mounted on a cardboard or plaster form. After the barrier coating has dried by evaporation of the solvent or solvent-water mixture, successive layers of adhesive, fabric coated with rubber and the like can be applied and the assembly cured. It, of course, is understood that after each adhesive coat is applied, and after the vapor barrier layer is applied, it should be permitted to dry, in air at room temperature or by being heated to a temperature of up to from 120–140° F., to remove all or essentially all of the solvent or solvents employed, before applying another adhesive coat or another functional layer. It will be appreciated that the polyamide composition layer as well as some of the other layers may adsorb moisture from the atmosphere or retain a slight amount of water or other solvent after the drying step. Finally, the cell can be spray coated with a lacquer of nitrile rubber and vinyl resin together with a minor amount of an adhesive resin as a finishing coat. This last step can be performed prior to or after vulcanizing if desired. The finished cell is then ready for use except for removal of the cardboard or plaster form which is easily accomplished by treating the cardboard with water or by breaking up the plaster and removing the same through man holes or ports in the cell.

Fuel cells prepared according to the method of the present invention do not show any cracking of the polyamide barrier layer during or after manufacture or after considerable use. Moreover, shrinkage has been kept to a minimum in that there is little, if any, evidence of the polyamide barrier layer pulling away from or separating from the other layers of material forming the cell which would cause rupture and further cracking. Furthermore, the adhesion of the new composition barrier is satisfactory and the diffusion of aromatics through the cell is less than when a barrier is used containing essentially only a polyamide.

The following examples will serve to illustrate the invention with more particularity to those skilled in the art:

EXAMPLE I 327 ml. of 95% ethanol were mixed with 21.7 ml. of water in a flask fitted with a reflux condenser, thermometer and stirrer and heated to a temperature of from 120 to 140° F., and 32.4 grams of long-chain linear superpolyamide (Du Pont FM–6501) were then charged to the flask and the mixture stirred and refluxed until the polyamide had dissolved to form a solution. The solution was permitted to cool and was applied as a coating directly on a layer (1″ x 12″) of a rubbery copolymer of about 65% butadiene-1,2 and the balance acrylonitrile and permitted to dry. A second coat was applied in the same way. After drying the laminate was measured and was found to have shrunk 6.8% of its original length and exhibited cracking. When the same procedure was repeated except that 8.1 grams of resorcinol were added to the polyamide solution to provide a ratio of about 80:20 polyamide to resorcinol, it was found that there were no cracks and the shrinkage was only 1.43% as compared to a shrinkage of 0.78% for an uncoated rubber strip. When the resorcinol content of the composition was increased to provide a ratio of 70/30 polyamide to resorcinol and the rubber treated with the composition and tested, it was found that the shrinkage was only 0.65% which was less than the uncoated strip so that it is indicated that the coating did not cause shrinkage. In the shrinkage test the uncured specimens, after each coating was applied, were dried for one hour at 82° F., 48% relative humidity and then were aged for 20 hours at room temperature before measurements were made. The uncoated strip was similarly heated and aged. Diffusion and adhesion tests were also run on these polyamide and polyamide-resorcinol composition coatings and the results are shown below:

| Test | Polyamide | Polyamide plus Resorcinol (80/20) |
|---|---|---|
| Adhesion (barrier layer disposed between adhesive coated nitrile rubber and sealant adhesively united thereto and to fabric plies), pounds | 7½ | 6½ |
| Diffusion (fl. oz./sq. ft./24 hours—Type #III fuel-barrier layer adhered to nitrile rubber): | | |
| at Room Temp | .039 | .010 |
| at 120° F | .024 | .014 |

While the adhesion value of the present composition is slightly less than when the polyamide is used alone, it is satisfactory, and its actual diffusion index is much better than when using the polyamide alone.

EXAMPLE II

This example was the same as Example I, above, except that the resorcinol was substituted by a number of compounds shown in Table A below, in the ratio of 20 parts by weight of the substitute to 80 parts of the polyamide. Coatings of such compositions were not cracked. Shrinkage variations are shown in Table A below:

Table A

| Substitute | Percent Shrinkage |
|---|---|
| Acetyl salicyclic acid | 2.34 |
| Tertiary butyl catechol | 2.47 |
| Catechol | 2.86 |
| Hydroquinone | 1.69 |
| Phthalic acid | 2.08 |
| Pyrogallol | 1.56 |
| Salicyclic acid | 2.73 |

The adhesion and diffusion data for such compositions were also satisfactory. Hence, it is apparent that a wide variety of highly polar aromatic compounds can be employed successfully in the practice of the present invention.

EXAMPLE III

The method of this example was the same as Example I, above, except that the resorcinol was used in varying ratios with respect to the polyamide. The resulting coatings were examined and tested. Data from such tests are shown below:

| Ratio of Polyamide to Resorcinol | Cracking | Shrinking | Adhesion | Diffusion Room Temp. | Diffusion 120° F. |
|---|---|---|---|---|---|
| 95/5 | None | Slight | Good | .017 | .020 |
| 90/10 | do | do | do | .021 | .020 |
| 85/15 | do | do | do | .012 | .014 |
| 75/25 | do | do | do | .009 | .014 |
| 70/30 | do | None | do | .000 | .000 |
| 60/40 | do | do | Fair | .007 | .010 |

The above results indicate that wide variations can still be made in the ratio of polyamide to the highly polar aromatic compound without adversely detracting from the properties of the coating as a liquid vapor barrier for fuel cells although best results are found in the range of about 65-85 parts polamide to 35-15 parts of the highly polar aromatic compound.

EXAMPLE IV

The method of this example was the same as Example I, above, except that the polyamide-resorcinol composition contained additionally 2.7 grams of formalin. The resulting coating evidenced no shrinkage nor cracks, exhibited an adhesion of 9 pounds and a diffusion index at room temperature of .005 and at 120° F. of .007. Hence, it is apparent that aldehydes are compatible with the polyamide-resorcinol composition and also show improvements in adhesion and diffusion values.

EXAMPLE V

The method of this example was the same as Example I, above, except that the resorcinol was replaced with benzoic acid, benzyl alcohol, cyclohexanol, 2-ethyl hexanediol, glycerol, 2-methoxy-4-methyl phenol, phenol or octyl phenol in the ratio of 20 parts by weight substitute to 80 parts polyamide. In each case cracks appeared in the dry coating. The shrinkage is shown in Table B below:

Table B

| Substitute | Percent Shrinkage |
|---|---|
| Benzoic acid | 3.65 |
| Benzyl alcohol | 5.2 |
| Cyclohexanol | 4.17 |
| 2-ethyl hexanediol | 7.3 |
| Glycerol | 6.8 |
| 2-Methoxy-4-methyl phenol | 3.91 |
| Phenol | 5.21 |
| Octyl phenol | 4.94 |
| Uncoated rubber base | 0.78 |

Moreover, in the case of benzyl alcohol the diffusion rate was also too great to be useful. This example illustrates the fact that unless the aromatic nucleus contains two highly polar groups selected from the class disclosed above, satisfactory results will not be obtained. Moreover, this example shows that the use of aliphatic or cyclic compounds will not provide the desired results. While the above types of compounds may, of course, be added to the compositions of the present invention they are not desired since their presence would tend to increase the shrinkage observed or detract from the properties of the composition.

In summary, the present invention teaches that a highly efficient liquid-vapor barrier for fuel cells can be produced by employing a composition comprising a long-chain linear superpolyamide with a minor amount of a highly polar aromatic compound. Barrier layers of the new composition are free of cracks and are highly shrink resistant. In fact in some instances barrier layers of the new composition exhibited no shrinkage while the maximum shrinkage observed was only about 50% of that of a barrier composed of only a polyamide. Moreover, the adhesion of the composition of the present invention is satisfactory and diffusion rates are considerably lower as compared to a polyamide barrier layer in which the highly polar aromatic compound was omitted. By using the presently disclosed composition, fuel cells can be made which do not crack during manufacture and storage thus eliminating costly rejects and wasted material. Moreover, fuel cells embodying the novel composition of the present invention do not present hazards in use. While the composition of the present invention has been directed primarily to use in fuel cells and to the cells per se, it is apparent that it can be used as a coating material or layer in a laminate wherever a crack-free, shrink-resistant liquid-vapor barrier material is desired such as in fuel lines or hose, valves and fittings on fuel containers, in gaskets to render electrical and mechanical equipment explosion-proof and the like. Furthermore, the cells described herein are not limited for use with only aromatic or aromatic-aliphatic fuels but can also be used with aliphatic and other fuels.

What is claimed is:

1. In a fuel cell comprising layers of fuel-resistant rubber, fabric and adhesives vulcanized into a composite structure, a liquid-vapor barrier layer disposed inwardly of the outer surface of said structure, combined with said structure and characterized by being essentially crack-free and shrink-resistant and comprising at least one aromatic fuel insoluble nylon and at least one compound added to said nylon and having the formula $$(R)_x\text{-}Ar\text{-}(P)_y$$

where Ar is an aromatic nucleus, where R is selected from at least one of the class consisting of alkoxy, alkyl, halogen and hydrogen; where $x$ is a number from 4 to 0; where P is selected from at least one of the class consisting of —OH, —COOH, —COOR$_2$, —OCOH, and —OCOR$_2$ where R$_2$ is alkyl and where $y$ is a number from 2 to 6, the ratio of said nylon to said compound being from about 85:15 to 65:35 parts by weight.

2. In a fuel cell according to claim 1 where said barrier layer is disposed between said fuel-resistant rubber and said fabric.

3. In a fuel cell according to claim 1 where said barrier layer is disposed between said fuel-resistant rubber and said fabric and containing additionally a rubber sealant layer disposed between said barrier layer and said fabric.

4. In a fuel cell according to claim 3 where said compound comprises pyrogallol.

5. In a fuel cell according to claim 3 where said compound comprises resorcinol.

6. In a fuel cell according to claim 3 where said compound comprises hydroquinone.

7. In the method comprising the steps of combining layers of a vulcanizable fuel-resistant rubber, fabric and adhesives to form an assembly and vulcanizing the same to form a composite article, the improvement comprising providing a liquid-vapor barrier layer for said assembly by depositing on a surface of at least one of said layers a composition for forming a coating when dry disposed inwardly of the outer surface of said assembly in use and combined with said assembly, said composition consisting essentially of a solution of a minor amount of water and a volatile alcohol and containing from about 5 to 20% by weight of a solid material comprising at least one aromatic fuel-resistant nylon and at least one compound added to said nylon and having the formula $$(R)_x\text{-}Ar\text{-}(P)_y$$

where Ar is an aromatic nucleus; where R is selected from at least one of the class consisting of alkoxy, alkyl, halogen, and hydrogen; where $x$ is a number from 4 to 0; where P is selected from at least one of the class consisting of —OH, —COOH, —COOR$_2$, —OCOH and —OCOR$_2$, where R$_2$ is alkyl and where $y$ is a number from 2 to 6, the ratio of said nylon to said compound being from about 85:15 to 65:35 parts by weight and drying said composition prior to vulcanizing said assembly to form said coating, said coating characterized by being crack-free and shrink resistant.

8. In the method according to claim 7, depositing said barrier composition layer on the layer of the vulcanizable fuel resistant rubber and then applying said fabric layer.

9. In the method according to claim 7, depositing said barrier composition layer on the layer of the vulcanizable fuel-resistant rubber, additionally depositing a layer of a sealant composition on said barrier layer and then applying said fabric layer.

10. In the method according to claim 9, where said compound comprises pyrogallol.

11. In the method according to claim 9, where said compound comprises resorcinol.

12. In the method according to claim 9, where said compound comprises hydroquinone.

13. In an article of manufacture comprising layers of fuel-resistant rubber, fabric and adhesives vulcanized into a composite structure, a liquid-vapor barrier layer disposed inwardly of the outer surface of said structure, combined with said structure, characterized by being essentially crack-free and shrink-resistant and comprising at least one aromatic fuel insoluble nylon and, added to said nylon, at least one compound having the formula $$(R)_x\text{-}Ar\text{-}(P)_y$$

where Ar is an aromatic nucleus; where R is selected from at least one of the class consisting of alkoxy, alkyl, halogen and hydrogen radicals; where $x$ is a number from 4 to 0; where P is selected from at least one of the class consisting of —OH, —COOH, —COOR$_2$, —OCOH, and —OCOR$_2$ radicals; where R$_2$ is alkyl and where $y$ is a number from 2 to 6, the ratio of said nylon to said compound being from 95:5 to 60:40 parts by weight.

14. In a fuel cell, a liquid-vapor barrier layer disposed inwardly of the outer surface of said cell, combined with said cell, characterized by being essentially crack-free and shrink-resistant and comprising at least one aromatic fuel insoluble nylon, and added to said nylon, at least one compound having the formula $$(R)_x\text{-}Ar\text{-}(P)_y$$

where Ar is an aromatic nucleus; where R is selected from at least one of the class consisting of alkoxy, alkyl, halogen and hydrogen radicals; where $x$ is a number from 4 to 0; where P is selected from at least one of the class consisting of —OH, —COOH, —COOR$_2$, —OCOH and —OCOR$_2$ radicals; where R$_2$ is alkyl and where $y$ is a number from 2 to 6, the ratio of said nylon to said compound being from 95:5 to 60:40 parts by weight.

15. In the method comprising the steps of combining layers of a vulcanizable fuel-resistant rubber, fabric and adhesives to form an assembly and vulcanizing the same to form a composite article, the improvement comprising providing a liquid-vapor barrier layer for said assembly by depositing on a surface of at least one of said layers a composition for forming a coating when dry and disposed inwardly of the outer surface of said assembly in use and combined with said assembly, said composition comprising essentially a solution comprising a volatile organic solvent and containing a minor amount by weight of a dissolved solid material comprising at least one aromatic fuel-resistant nylon and, added to said nylon, at least one compound having the formula $(R)_x\text{-}Ar\text{-}(P)_y$ where Ar is an aromatic nucleus; where R is selected from at least one of the class consisting of alkoxy, alkyl, halogen and hydrogen radicals; where $x$ is a number from 4 to 0; where P is selected from at least one of the class consisting of —OH, —COOH, —COOR$_2$, —OCOH and —OCOR$_2$ radicals where R$_2$ is alkyl and where $y$ is a number from 2 to 6, the ratio of said nylon to said compound being from 95:5 to 60:40 parts by weight, and drying said composition prior to vulcanizing said assembly to form said coating, said coating characterized by being crack-free and shrink-resistant.

16. In a fuel cell according to claim 2 where said compound comprises resorcinol.

17. In the method according to claim 8, where said compound comprises resorcinol.

18. In an article of manufacture comprising layers of fuel-resistant rubber, fabric and adhesives vulcanized into a composite structure, a liquid-vapor barrier layer disposed inwardly of the outer surface of said structure, combined with said structure, characterized by being essentially crack-free and shrink-resistant and comprising at least one aromatic fuel insoluble nylon and, added to said nylon, at least one compound having the formula $(R)_x\text{-}Ar\text{-}(OH)_y$ where Ar is an aromatic nucleus; where R is selected from at least one of the class consisting of alkoxy, alkyl, halogen and hydrogen radicals; where $x$ is a number from 4 to 0 and where $y$ is a number from 2 to 6, the ratio of said nylon to said compound being from 95:5 to 60:40 parts by weight.

19. In the method comprising the steps of combining layers of a vulcanizable fuel-resistant rubber, fabric and adhesives to form an assembly and vulcanizing the same to form a composite article, the improvement comprising providing a liquid-vapor barrier layer for said assembly by depositing on a surface of at least one of said layers a composition for forming a coating when dry and disposed inwardly of the outer surface of said assembly in use and combined with said assembly, said composition comprising essentially a solution comprising a volatile organic solvent containing a minor amount by weight of a dissolved solid material comprising at least one aromatic fuel-resistant nylon and at least one compound, added to said nylon, and having the formula $$(R)_x[Ar](OH)_y$$

where Ar is an aromatic nucleus; where R is selected from at least one of the class consisting of alkoxy, alkyl, halogen and hydrogen radicals; where $x$ is a number from 4 to 0 and where $y$ is a number from 2 to 6, the ratio of said nylon to said compound being from 95:5 to 60:40 parts by weight and drying said composition prior to vulcanizing said assembly to form said coating, said coating characterized by being crack-free and shrink-resistant.

References Cited in the file of this patent

UNITED STATES PATENTS

| | | |
|---|---|---|
| 1,090,439 | Aylsworth | Mar. 17, 1914 |
| 2,035,819 | Madge et al. | Mar. 31, 1936 |
| 2,252,554 | Carothers | Aug. 12, 1941 |
| 2,279,752 | Jacobson | Apr. 14, 1942 |
| 2,360,864 | Fryling | Oct. 24, 1944 |
| 2,381,739 | Gray | Aug. 7, 1945 |
| 2,418,172 | Griffith | Apr. 1, 1947 |
| 2,419,016 | Gray et al. | Apr. 15, 1947 |
| 2,422,239 | Holt | June 7, 1947 |
| 2,440,965 | Merrill et al. | May 4, 1948 |
| 2,687,977 | Gerke | Aug. 31, 1954 |
| 2,694,029 | Skinner | Nov. 9, 1954 |

FOREIGN PATENTS

| | | |
|---|---|---|
| 634,422 | Great Britain | Mar. 22, 1950 |
| 116,700 | Australia | Mar. 10, 1943 |